Inventors:
Hubert R. Sills,
Dow V. Canning,
by Harry E. Dunham
Their Attorney.

Patented Nov. 14, 1939

2,180,174

UNITED STATES PATENT OFFICE 2,180,174

PROTECTIVE SYSTEM

Hubert R. Sills and Dow V. Canning, Peterborough, Ontario, Canada, assignors to General Electric Company, a corporation of New York Application October 28, 1937, Serial No. 171,497

10 Claims. (Cl. 172—274)

Our invention relates to protective systems and particularly to a system for protecting the secondary winding of a polyphase motor when only a concentrated portion of its armature winding is energized and the motor is operating at a subsynchronous speed, and one object of our invention is to provide a protective arrangement for preventing a voltage of sufficient magnitude to break down the insulation of the secondary winding from being built up under such operating conditions of the motor.

When one or more of the polyphase armature windings of a synchronous machine, which is provided with a plurality of concentrated armature windings, are energized a high voltage appears across the field windings which are in close coupling with the energized armature windings. This high voltage is due to the fact that the field windings are connected in series so that the current that flows as a result of the voltage induced in the field windings on the active poles must flow through the field windings on the inactive poles, and these latter field windings have a relatively high reactance.

In accordance with our invention, we prevent the voltage across any field winding from building up to a high value by connecting relatively low impedances respectively in shunt with different sections of the series connected field winding circuit.

Figure 1:
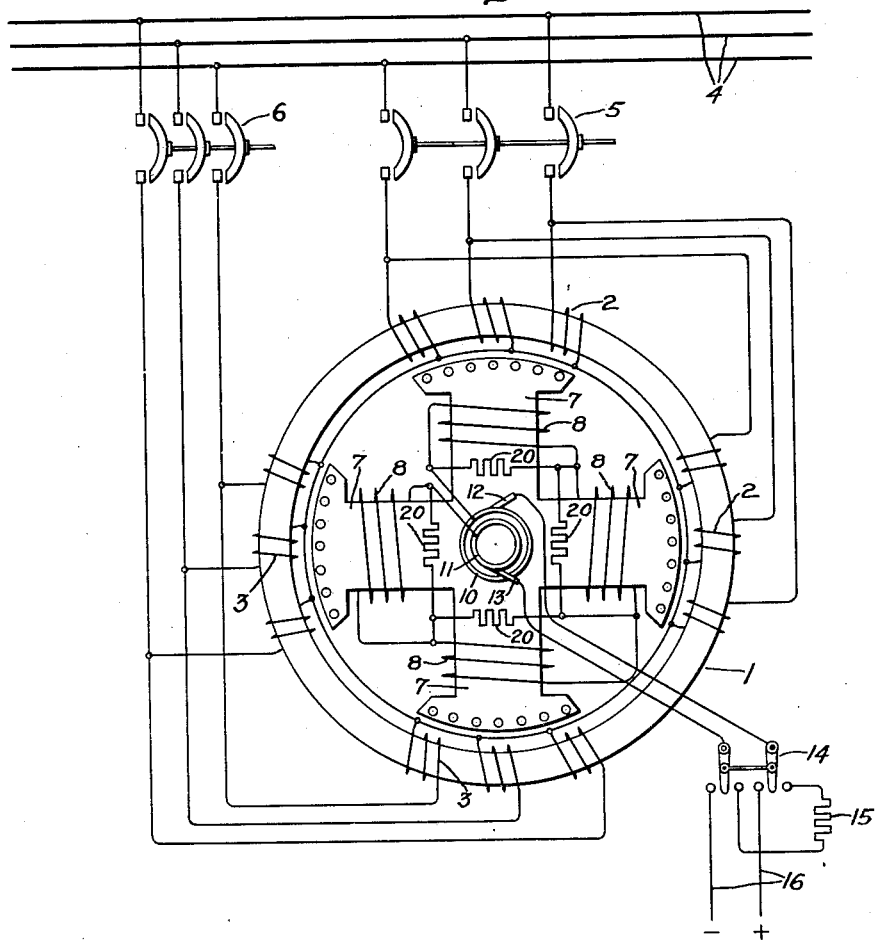
Figure 2:
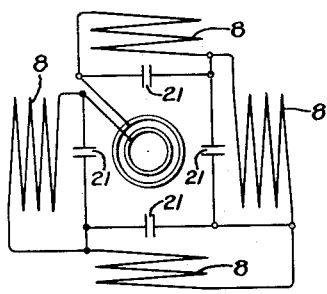

Our invention will be better understood from the following description when taken in connection with the accompanying drawing, Fig. 1 of which diagrammatically illustrates a synchronous motor and control therefor embodying our invention and Fig. 2 shows a modification of the arrangement shown in Fig. 1 and its scope will be pointed out in the appended claims.

Referring to the drawing, 1 represents a three-phase synchronous motor having two groups of armature windings 2 and 3 on its stator. In order to simplify the disclosure, we have illustrated our invention in connection with a four-pole synchronous motor, but it will be obvious to those skilled in the art that in practice our invention will usually be used with motors having more than four poles. The group of armature windings 2 is arranged to be connected to a suitable polyphase source of current 4 by suitable switching means 5, and the group of armature windings 3 is arranged to be connected to the source 4 by a suitable switching means 6. The switching means 5 and 6 may be operated either by hand or automatically in any suitable manner so that the winding groups 2 and 3 are connected to the source 4 in a predetermined sequence. Preferably the motor is started by closing one of the switching means so that only one group of armature windings is energized to start the motor from rest. After the motor has reached a predetermined speed, the other switching means is then operated so that both groups of armature windings are energized during the normal operation of the motor.

The rotor of the motor 1, as shown, has four polar projections 7 on each of which is wound a field magnet winding 8. The four field magnet windings 8 are connected in series with each other, and ends of this series circuit terminate respectively at the two slip rings 10 and 11 which are engaged by brushes 12 and 13 respectively. The brushes 12 and 13 are connected to a two-positioned switch 14 which, in one position, connects a discharge resistor 15 across the slip rings 12 and 13 and which, in its other position, connects a suitable source of excitation 16 to the slip rings 12 and 13.

In order to limit to a safe value the voltage across the field magnet windings 8 when only one of the two groups of armature windings is energized and the switch 14 is in its position in which the resistor 15 is connected across the collector rings 12 and 13, we connect in parallel with each of the field windings 8 an impedance which in the particular embodiment of our invention shown in Fig. 1 of the drawing is a resistor 20. These four resistors are preferably mounted on the rotor in any suitable manner and are designed so that they have impedance values which are relatively low. Also it may be desirable in some cases to construct the resistors 20 of material which has a negative voltage-impedance characteristic.

When it is desired to start the motor 1, the switch 14 is moved to its position in which the discharge resistor 15 is connected across the brushes 12 and 13 and then either the switch 5 or 6 is closed to energize one group of armature windings only. The motor then starts as an induction motor and accelerates to a speed near synchronous speed.

While the motor is operating with only one group of armature windings, it is obvious to one skilled in the art that as the rotor rotates, two of the field magnet windings are in close coupling with the energized group of armature windings at any given instant and the remaining two field magnet windings are not and that the two windings that are in close coupling periodically change. Since all of the windings are connected in series and the impedances of the windings are high with respect to the discharge resistor, it is evident that if it were not for the shunt resistors 20, a very high voltage would be built up across the windings which might result in a breakdown in the insulation.

After the motor reaches a predetermined speed, the other group of armature windings is connected to the source 4 and the switch 14 is moved to its other position so that the source of excitation 16 is connected across the brushes 12 and 13.

In the modification of our invention shown in Fig. 2, the shunt resistor 20 across each field winding 8 is replaced by a capacitor 21 which has the desirable characteristic that its impedance varies inversely with the frequency consequently at start when the slip frequency is high, the impedance of each capacitor is low and most of the slip frequency current will flow through them so as to limit the voltage across the field windings to the voltage drop across the respective shunt capacitors. When, however, the motor approaches synchronous speed the field windings on the unexcited poles will then become the low impedance paths and will produce a desirable pull-in characteristic.

While we have, in accordance with the patent statutes, shown and described our invention as applied to a particular system and as embodying various devices diagrammatically indicated, changes and modifications will be obvious to those skilled in the art, and we therefore aim in the appended claims to cover all such changes and modifications as fall within the true spirit and scope of our invention.

What we claim as new and desire to secure by Letters Patent of the United States is:

1. In combination, an alternating current motor having a plurality of concentrated primary windings, means for energizing said primary windings in a predetermined sequence, a secondary winding on said motor having a plurality of sections connected in a series circuit and distributed so that all of said sections are simultaneously in close coupling with energized primary windings only when all of said primary windings are simultaneously energized, and means for limiting the voltages of slip frequency induced in the secondary winding sections by the energized portion of the primary windings when said motor is operating subsynchronously with only a portion of said primary windings energized comprising means respectively associated with different secondary winding sections for limiting the voltages induced therein.

2. In combination, an alternating current motor having a plurality of concentrated primary windings, means for energizing said primary windings in a predetermined sequence, a secondary winding on said motor having a plurality of sections connected in a series circuit and distributed so that all of said sections are simultaneously in close coupling with energized primary windings only when all of said primary windings are simultaneously energized, and means for limiting the voltages of slip frequency induced in the secondary winding sections by the energized portion of the primary windings when said motor is operating subsynchronously with only a portion of said primary windings energized comprising low impedance shunt circuits around different portions of said series circuit.

3. In combination, a synchronous motor having a plurality of concentrated primary windings, means for energizing said primary windings in a predetermined sequence, a plurality of field magnet windings on said motor connected in a series circuit and spaced so that all of them are simultaneously in close coupling with energized primary windings only when all of said primary windings are simultaneously energized, and means for limiting the voltage of slip frequency induced in said field magnet windings by an energized primary winding during subsynchronous operation of said motor with only a portion of said primary windings energized comprising low impedance shunt circuits around different portions of said series circuit.

4. In combination, a synchronous motor having a plurality of concentrated primary windings, means for energizing said primary windings in a predetermined sequence, a plurality of field magnet windings on said motor connected in a series circuit and spaced so that all of them are simultaneously in close coupling with energized primary windings only when all of said primary windings are simultaneously energized, and means for limiting the voltage of slip frequency induced in said field magnet windings by an energized primary winding during subsynchronous operation of said motor with only a portion of said primary windings energized comprising resistors having relatively low resistance values respectively connected in parallel with different field windings.

5. In combination, a synchronous motor having a plurality of concentrated primary windings, means, means for energizing said primary windings in a predetermined sequence, a plurality of field magnet windings on said motor connected in a series circuit and spaced so that all of them are simultaneously in close coupling with energized primary windings only when all of said primary windings are simultaneously energized, and means for limiting the voltage of slip frequency induced in said field magnet windings by an energized primary winding during subsynchronous operation of said motor with only a portion of said primary windings energized comprising capacitors respectively connected in shunt with different field windings.

6. In combination, a salient pole synchronous motor having only a predetermined concentrated portion of its armature winding energized and having the field magnet windings on its salient poles connected in a series circuit, and means for limiting the voltages induced in said field windings due to the slip of said motor including low impedance shunt circuits connected in parallel with different portions of said series circuit.

7. In combination, a salient pole synchronous motor having only a predetermined concentrated portion of its armature winding energized and having the field magnet windings on its salient poles connected in a series circuit, and means for limiting the voltages induced in said field windings due to the slip of said motor including resistors respectively connected in parallel with different portions of said series circuit.

8. In combination, a salient pole synchronous motor having only a predetermined concentrated portion of its armature winding energized and having the field magnet windings on its salient poles connected in a series circuit, and means for limiting the voltages induced in said field windings due to the slip of said motor including resistors mounted on the rotor of said motor and respectively connected in parallel with different field magnet windings.

9. In combination, a salient pole synchronous motor having only a predetermined concentrated portion of its armature winding energized and having the field magnet windings on its salient poles connected in a series circuit, and means for limiting the voltages induced in said field windings due to the slip of said motor including capacitors respectively connected in parallel with different portions of said series circuit.

10. In combination, a salient pole synchronous motor having only a predetermined concentrated portion of its armature winding energized and having the field magnet windings on its salient poles connected in a series circuit, and means for limiting the voltages induced in said field windings due to the slip of said motor including capacitors mounted on the rotor of said motor and respectively connected in parallel with different field magnet windings.

HUBERT R. SILLS.
DOW V. CANNING.